United States Patent [19]
Hirota et al.

[11] Patent Number: 5,656,359
[45] Date of Patent: Aug. 12, 1997

[54] DECORATIVE SHEET

[75] Inventors: Yoichi Hirota; Ichiro Kawahata; Takashi Matano, all of Tokyo-to, Japan

[73] Assignee: Dai Nippon Printing Co., Ltd., Japan

[21] Appl. No.: 464,707

[22] PCT Filed: Oct. 25, 1994

[86] PCT No.: PCT/JP94/01785

§ 371 Date: Aug. 8, 1995

§ 102(e) Date: Aug. 8, 1995

[87] PCT Pub. No.: WO95/11804

PCT Pub. Date: Oct. 25, 1993

[30] Foreign Application Priority Data

Oct. 25, 1993 [JP] Japan ................... 5-287292

[51] Int. Cl.$^6$ ............................................ B32B 3/00
[52] U.S. Cl. .................. 428/195; 428/204; 428/207; 428/212; 428/411.1; 428/414; 428/500; 428/688
[58] Field of Search ................. 428/195, 411.1, 428/414, 423.1, 500, 524, 204, 207, 212, 688

[56] References Cited

U.S. PATENT DOCUMENTS 2,069,228  2/1937  Eichstadt .

FOREIGN PATENT DOCUMENTS

| 53-135712 | 11/1978 | Japan . |
| 61-293854 | 12/1986 | Japan . |
| 62-60681 | 3/1987 | Japan . |
| 4-220342 | 8/1992 | Japan . |

OTHER PUBLICATIONS

Patent Abstracts of Japan, vol. 7, No. 223, 4 Oct. 1983 & JP-A-58 118289, 14 Jul. 1983.

Derwent Publications Ltd., London, GB; AN 90-129017 & JP-A-02078 546, 19 Mar. 1990 Abstract.

Primary Examiner—William Krynski
Attorney, Agent, or Firm—Parkhurst, Wendel & Burr, L.L.P.

[57] ABSTRACT

An object of the present invention is to provide a decorative sheet having an appearance, feeling and touch which are remarkably resemble to those of the grain of natural wood, and being excellent also in material characteristics such as abrasion resistance and heat resistance. The decorative sheet of the invention is characterized in that it comprises a substrate sheet, and a grain-pattern-printed layer having a grain pattern, formed on the substrate sheet, and that a built-up printed portion is provided on at least a part of a vessel pattern portion in the grain pattern of the grain-pattern-printed layer in such a manner that the built-up printed portion substantially corresponds with the vessel pattern portion.

7 Claims, 1 Drawing Sheet

DECORATIVE SHEET

FIELD OF THE INVENTION

The present invention relates to decorative sheets which are used for decorating the surface of furniture or construction materials such as wall covering materials and ceiling materials, and, more particularly, to decorative sheets having a wood grain pattern.

BACKGROUND ART

Conventionally known decorative sheets useful for surface decoration include the following:

(1) A precoated sheet prepared by providing an embossed pattern on one surface of a substrate sheet by means of an ordinary printing method, using an ink which has a high solid, such as a pigment, content, and then forming thereon a surface layer by using a varnish composed of an aminoalkyd resin, a urethane resin or the like (Japanese Patent Laid-Open Publications Nos. 76115/1977 and 71908/1978).

(2) A decorative sheet prepared by prepared by providing a pattern on one surface of a substrate sheet by the use of an ink which contains an ordinary printing ink and a foaming agent, and then expanding the foaming agent to partly provide a built-up portion in the pattern (Japanese Patent Publication No. 12285/1961).

(3) A decorative sheet prepared by laminating a transparent sheet to the printed surface of a pattern-printed colored substrate sheet, and, when necessary, forming an embossed pattern during this laminating process (Japanese Patent Laid-Open Publication No. 14312/1983).

(4) A resin-impregnated decorative plate prepared by printing a pattern on a substrate sheet which is excellent in resin-impregnating, ability, impregnating the substrate sheet with a resin, and then curing the resin (Japanese Patent Publication No. 4540/1951).

The above-described conventional decorative sheets are not necessarily satisfactory when they have a natural pattern such as a grain pattern. There is a limit to the formation of a natural pattern such as a grain pattern by an artificial printing technique. It is the present situation that only such a decorative sheet that has an artificial and unnatural appearance, lacking in natural feeling is obtained by any of the conventional methods.

In addition, the above conventional decorative sheets (1) to (4) have the following problems to be solved.

(1) To prepare the conventional precoated sheets, an embossed pattern is provided by printing. However, the ink used is poor in printability, so that the pattern is limited by the color tone and the density, and thus the desired embossed pattern cannot be fully obtained. Further, a varnish composed of an aminoalkyd resin, a urethane resin or the like, by which a resinous surface layer is formed, is hard and brittle. Therefore, only a small amount of the varnish can be applied, and the resulting layer is thus poor in abrasion resistance.

(2) The decorative sheets with portions built-up by the expansion of a foaming agent may have a good three-dimensional pattern. However, many of the decorative sheets of this type are composed of polyvinyl chloride, which is a thermoplastic resin, so that there has been such a problem that they are poor in both abrasion resistance and heat resistance. Further, the pattern itself is formed by bulging in these decorative sheets; this is unsuitable to obtain a decorative sheet which has a pattern resemble to a natural pattern such as a grain pattern.

Furthermore, in order to provide built-up printed portions having heat resistance, an ink has been prepared by the use of a binder which contains as main components a reactive acrylic resin and a vinyl chloride copolymer. However, it is difficult to add a pigment to this ink in such an amount as is adopted to an ordinary ink. For this reason, the range of the type and the amount of a pigment suitable to obtain a desired density is narrow, and only an unsatisfactory color tone is obtained. For example, when a pigment such as iron oxide or titanium oxide is incorporated, the ink loses its fluidity, and becomes dilatant even when its viscosity is controlled by a solvent. Such an ink is unsuitable for printing. Moreover, it has been difficult to prepare a printing ink capable of providing a pattern with a high color density.

(3) The conventional decorative sheets prepared by laminating a transparent sheet to the printed surface of a pattern-printed colored substrate sheet are excellent in abrasion resistance because the pattern layer is protected by the transparent sheet. However, many of the decorative sheets of this type are composed of polyvinyl chloride, which is a thermoplastic resin, so that there is such a problem that they are poor in heat resistance.

(4) The conventional decorative plates impregnated with a thermosetting resin have moderate heat resistance and abrasion resistance. However, it is difficult to form an embossed pattern which is fully corresponding with the desired pattern. In addition, the decorative plates of this type are lacking in flexibility, and also expensive.

The present invention has been accomplished in the light of the above-described prior art. An object of the present invention is therefore to provide a decorative sheet which has an appearance, feeling and touch which are remarkably resemble to those of the grain of natural wood, and which is also excellent in material characteristics such as abrasion resistance and heat resistance.

DISCLOSURE OF THE INVENTION

A decorative sheet according to the present invention comprises a substrate sheet, and a grain-pattern-printed layer having a grain pattern, formed on the substrate sheet, in which a built-up printed portion is provided on at least a part of a vessel pattern portion in the grain pattern of the grain-pattern-printed layer in such a manner that the bulged printed portion substantially corresponds with the vessel pattern portion.

In another embodiment of the present invention, the color difference between the wood matrix pattern area and the built-up printed portion is in the range of 60 or less as measured in accordance with JIS-Z8730.

In a further embodiment of the present invention, the above-described built-up printed portion is made of a cured product of a coloring ink composition comprising (a) a coloring agent, and (b) a binder which contains an epoxy compound, a vinyl chloride copolymer and a reactive acrylic compound, and the epoxy compound contained in the binder is preferably at least one compound selected from epoxidized triglycerides, epoxidized fatty monoesters and condensation products of epichlorohydrine and bisphenol.

In a further embodiment of the present invention, the above-described built-up printed portion provided on the vessel pattern portion has a gloss.

In a further embodiment of the present invention, a top coat layer is provided on the outermost surface of the above-described grain-pattern-printed layer. It is preferable that a portion of the top coat layer which is on a portion other than the built-up printed portion be matte, and, at the same time, that a portion of the top coat layer which is on the built-up printed portion be glossy.

In a further embodiment of the present invention, the height of the built-up printed portion is from 10 to 150 μm.

BEST MODE FOR CARRYING OUT THE INVENTION

Figure 1:
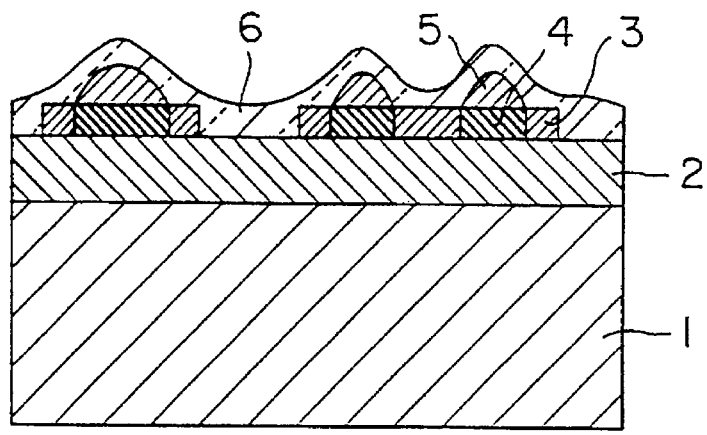
FIG. 1 is a cross-sectional view of a decorative sheet according to the present invention.
Figure 2:
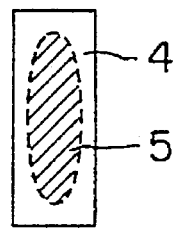
FIGS. 2 to 6 are illustrations each showing an embodiment in which a built-up printed portion is provided so as to correspond with a vessel-pattern-printed portion.
Figure 3:
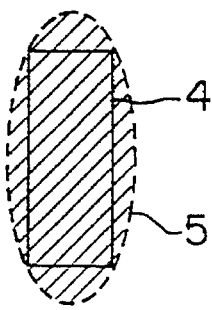
Figure 4:
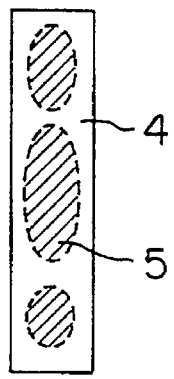
Figure 5:
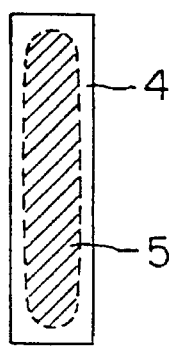
Figure 6:
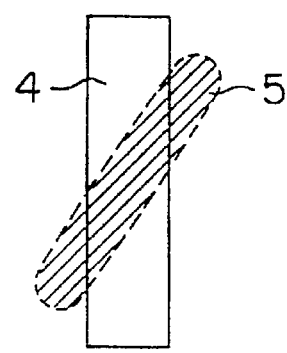

A decorative sheet according to the present invention is, for instance, prepared by successively providing a substrate sheet 1, a solid print layer 2, a pattern-printed portion 3, a vessel-pattern-printed portion 4, a built-up printed portion 5, and a top coat layer 6 as shown in FIG. 1.

In the present invention, a grain pattern (a wood matrix pattern area) is composed of the solid print layer 2, the pattern-printed portion 3 and the vessel-pattern-printed portion 4.

Further, the present invention is characterized in that the built-up printed portion 5 is provided on at least a part of the vessel-pattern-printed portion so that the built-up printed portion can substantially correspond with the vessel-pattern-printed portion. The words "correspond with" as used herein do not always mean that the vessel-pattern-printed portion and the built-up printed portion completely correspond with each other, but include the embodiments as shown in FIGS. 2 to 6. Namely, the present invention includes an embodiment in which a built-up printed portion 5 is provided within a vessel-pattern-printed portion 4 (FIG. 2), an embodiment in which a vessel-pattern-printed portion 4 is covered with a built-up printed portion 5 (FIG. 3), an embodiment in which a built-up printed portion 5 is discontinuously provided within a vessel-pattern-printed portion 4 (FIG. 4), an embodiment in which a built-up printed portion 5 is provided parallel to the longer direction of a vessel-pattern-printed portion 4 (FIG. 5), an embodiment in which a built-up printed portion 5 is provided at a specific angle to the longer direction of a vessel-pattern-printed portion 4 (FIG. 6), and all other embodiments similar to these embodiments. Further, an embodiment in which the above embodiments are mixed is also included in the scope of the present invention.

Furthermore, in a preferred embodiment of the present invention, the color difference between the above-described bark pattern area and the built-up printed portion is in the range of 60 or less as measured in accordance with JIS-Z8730.

The above color difference is calculated by the calculation method for obtaining the color difference according to the L*a*b* color system, and, specifically, it is the value $\Delta E^*_{ab}$ obtainable from the following equation:

$$\Delta E^*_{ab} = [(\Delta L^*)^2 + (\Delta a^*)^2 + (\Delta b^*)^2]^{1/2}$$

where $\Delta E^*_{ab}$ is a color difference according to the L*a*b* color system, and $\Delta L^*$, $\Delta a^*$, and $\Delta b^*$ respectively represent the differences in lightness index L* and chromaticness indexes a* and b* between two material colors in the L*a*b* color system defined in JIS-Z8729. The values of L*, a* and b* can be calculated from tristimulus values X, Y and Z defined in JIS-Z8722 and JIS-Z8727.

It is an unexpected effect that an appearance resembling the grain of natural wood can be given to the grain pattern by restricting the color difference between the wood matrix pattern area and the built-up printed portion provided on the vessel-pattern-printed portion to 60 or less, preferably 45 or less, and more preferably 30 or less.

Further, in a preferred embodiment of the present invention, the built-up printed portion provided on the vessel-pattern-printed portion have a gloss. The inventors of the present invention has found that the gloss imparted can act in co-operation with the action of the above-described color difference to show an excellent effect on the reproduction of the impression of the grain of natural wood. It has been recognized that such a gloss effect particularly contributes to give the impression of a scrubbed finish which is provided on the cross-section of natural wood.

Furthermore, in a preferred embodiment of the present invention, the durability, abrasion resistance and heat resistance of the decorative sheet can be improved, and the above-described gloss effect can also be increased by providing a top coat layer on the outermost surface of the grain-pattern-printed layer.

Furthermore, in a preferred embodiment of the present invention, it is possible to make a portion of the top coat layer which corresponds to the wood matrix pattern area (a portion other than the built-up printed portion) matte, and to make only a portion of the top coat layer which corresponds to the built-up printed portion glossy.

Furthermore, in another embodiment of the present invention, it is possible to impart a gloss to the portion of the top coat layer which corresponds to the wood matrix pattern area and to the portion of the top coat layer which corresponds to the built-up printed portion (full gloss) to make the gloss of the built-up printed portion (e.g. 92%) higher than that of the wood matrix pattern area (e.g. 73%). On the contrary, it is also possible to make the portion of the top coat layer which corresponds to the wood matrix pattern area and the portion of the top coat layer which corresponds to the built-up printed portion matte (full matte) with the gloss of the built-up printed portion (e.g. 41%) higher than that of the bark pattern area (e.g. 17%). Either one of these embodiments may be properly selected depending upon the conditions and intended use of the final product.

In addition, in a preferred embodiment of the present invention, the height of the built-up printed portion is controlled to 10 to 150 μm.

In the present invention, for example, thin paper having a basis weight of 22 to 65 g/m², reinforced paper containing a resin, resin-impregnated paper having a basis weight of 50 to 150 g/m² or the like is preferably used as the substrate sheet. In the case where heat resistance is not particularly required, a polyvinyl chloride sheet, or a plastic sheet such as of polyester can also be used besides synthetic paper; any material can be used as the substrate sheet as long as it can be printed, and laminated to plywood.

In the present invention, rotary printing which is conducted in a winding manner such as gravure rotary printing or flexographic printing, or silk screen printing is preferable as a means for printing a pattern on each printed layer from the viewpoint of the steps which will be conducted after the printing, such as lamination to plywood. Further, it is preferable to form the built-up printed portion by means of gravure intaglio printing, in which any type of solvent can be used for a printing ink, and which can impart a gradation to an embossed pattern.

Printing of the solid print layer 2, the pattern printed portion 3 and the vessel-pattern-printed portion 4 can be conducted by any known method, using any known ink composition, and there is no particular limitation thereon.

An ink composition to be used for this purpose may be properly selected from the known ones so that the previously-described color difference can be attained. Further, in particular, phthalate esters such as diethyl phthalate, dibutyl phthalate, butyl lauryl phthalate, di-n-octyl phthalate and butyl benzyl phthalate, esters such as butyl phthalyl butyl glycolate, di-2-ethylene hexyl adipate, dioctyl sebacate, trioctyl phosphate and methyl acetylricinoleate, chlorinated paraffin, epoxidized soybean oil, and epoxy plasticizers may be used either singly or as a mixture of two or more as a plasticizer to plasticize the solid print layer and the pattern-printed portion.

In the present invention, the coloring ink composition used for forming the built-up printed portion preferably comprises (a) a coloring agent, and (b) a binder containing an epoxy compound, a vinyl chloride copolymer and a reactive acrylic compound. A predetermined pattern is printed by building up this coloring ink composition, which is then cured. The built-up printed portion is thus formed.

There is no particular limitation on the type of a pigment which can be used for the above-described ink composition of the invention, and any conventionally known pigment can be used as long as it is excellent in heat resistance, light resistance and abrasion resistance. For example, any inorganic pigment such as titanium white, aluminum powder, iron oxide or carbon black, threne yellow, quinacridone red, copper phthalocyanine blue or copper phthalocyanine green may be properly used. In particular, a suitable pigment may be selected in consideration of the above-described heat resistance, light resistance, abrasion resistance and color difference.

The binder preferably comprises an epoxy compound, a vinyl chloride copolymer and a reactive acrylic resin. The vinyl chloride resin for use in this binder may be preferably selected from polyvinyl chlorides having a polymerization degree of 500 to 1300, and a copolymer of vinyl chloride and a vinyl acetate resin, polyvinyl alcohol or maleic anhydride which is suitable for modification conducted to impart heat resistance and solubility.

In the present invention, the epoxy compound incorporated as the binder component acts as a plasticizer, and at least one compound selected from (i) epoxidized triglycerides such as epoxidized soybean oil and epoxidized linseed oil, (ii) epoxidized fatty monoesters such as. epoxidized fatty octylester, epoxidized fatty alkylester and epoxidized fatty butyl, and (iii) condensation products of epichlorohydrine and bisphenol may be preferably used.

In the present invention, a compound properly selected from carboxylates, metal soaps and epoxidized oils of a tin, cadmium, barium, zinc or calcium type can also be added as a stabilizer.

Further, a reactive acrylic resin (reactive acrylic compound) is used as a polymerizable monomer or oligomer in the above binder. Monofunctional 2-ethylhexyl acrylate, 2-hydroxyethyl acrylate, 2-hydroxypropyl acrylate or 2-hydroxyethylacryloyl phosphate; difunctional 1,3-butanediol diacrylate, 1,4-butanediol diacrylate, 1,6-hexanediol acrylate, diethylene glycol diacrylate, tripropylene glycol diacrylate, neobenzylglycol diacrylate, polyethylene glycol 400 diacrylate, hydroxypivalate or neobenzylglycol diacrylate; or trifunctional trimethylolpropane triacrylate, pentaerythritol triacrylate or dipentaerithritol hexaacrylate may be preferably used as the polymerizable monomer.

Polyester acrylate, polyurethane acrylate, epoxy acrylate, oligoacrylate, melamine acrylate or silicone acrylate may be preferably used as the polymerizable oligomer.

As described above, the reactive acrylic compound indicates, in the present invention, a polymerizable monomer, or a compound containing as its main part a polymerizable monomer. The above reactive acrylic compounds may be used either singly or as a mixture of two or more. Although the above-enumerated polymerizable monomers and oligomers are in the form of acrylate having an acryloyl group, methacrylate can also be used in place of the acrylate.

Irradiation of ionizing radiation is a preferable means to react these reactive acrylic compounds. Further, for example, when the ultraviolet-light irradiation method is employed, a photopolymerization initiator and/or, if necessary, a sensitizer can be incorporated. Examples of the photopolymerization initiator include biacetyl, acetophenone, benzophenone, benzyl benzoin, benzoin isobutyl ether, benzyl methyl ketal, azobisisobutyronitrile, benzoyl peroxide, 1-hydroxycyclohexylphenyl ketone and α-isopropyl-α-hydroxyisobutylphenone. Besides these compounds, any compound which generates radicals when ultraviolet light is irradiated may also be used. Triethylamine, diethylaminoethyl methacrylate or the like may be preferably used as the sensitizer which induces the generation of radicals.

On the other hand, an initiator can be used also in the case where heat is applied to react the reactive acrylic compounds. In this case, azobisisobutyronitrile as well as a peroxide such as benzoyl peroxide or methyl ethyl ketone peroxide may be preferably used as the initiator.

The above-described ink composition for forming the built-up printed portion has a high solid content, has no limitation on a pigment which can be used therein, and can be made to a thixotropic fluid. Therefore, the ink composition is excellent in that it can form a built-up printed portion having high abrasion resistance and high heat resistance without a limitation on a design caused due to color tone.

Further, in a preferred embodiment of the present invention, since the built-up printed portion is formed by using the above ink composition, it can be excellent in gloss. On the contrary, in the case of building up printing of the conventional foaming type, the built-up printed portion obtained is porous and rough, so that it cannot acquire a gloss.

According to the views of the inventors of the present invention, an unexpected effect can be obtained by imparting a gloss to the built-up printed portion which corresponds; the vessel-pattern-printed portion. This means that an appearance resembling to the grain of natural wood can be given to the grain-like pattern by imparting a gloss to the built-up printed portion, and, at the same time, by restricting the color difference between the built-up printed portion and the wood matrix pattern area to, as described previously, 60 or less, preferably 45 or less, and more preferably 30 or less.

The gloss of the built-up printed portion is further increased when a top coat layer which will be described later is provided thereon.

Gravure printing is preferable as a means for forming the built-up printed portion by the use of the ink composition comprising the binder which contains the above-described components. This is because printing can be stably conducted by winding and a better building-up effect can be obtained in this method.

In this case, a gravure with a depth of 40 to 200 μm is preferably used. There is no particular limitation on the shape of screen. However, in general, a striped wire screen of 50 lines/25 mm is effective to print a pattern which is relatively fine and contains a small embossed-pattern area because such a screen can stabilize the transferability of the ink.

A screenless plate can also be used.

The thickness of an embossed pattern formed by the transferred ink is determined depending upon the design. When this thickness is large, a three-dimensional pattern or design can be expressed. In the case where a variation of gloss is expected rather than an embossed pattern, the thickness can be made to approximately 3 to 5 µm. However, when abrasion resistance is required, the thickness is properly selected from the range of 5 to 200 µm, and preferably from the range of 10 to 150 µm. It is noted that the height of the built-up printed portion means a value obtained by subtracting the thickness of the pattern-printed portion from that of the built-up printed portion.

Although the built-up printed portion having an embossed pattern can be formed separately from the process of ordinary pattern printing, it is preferable to print the built-up printed portion and the pattern-printed portion in one process in order to maintain highly accurate correspondence between them. In this case, the embossed pattern provided by printing becomes a part of the design. The embossed pattern can be provided either before or after, or even between the formation of the pattern-printed portion and the vessel-pattern-printed portion; the timing is determined depending upon the design. The printing ink may be cured by the irradiation of ionizing radiation such as ultraviolet light. It may also be cured, depending upon the drying type of the ink used, by evaporation to dryness with the application of heat, or by thermal hardening.

In the present invention, a top coat layer having transparency (including semitransparency) can also be provided in order to protect the printed layer, or to control the surface Gloss. The top coat layer can be formed by using any varnish selected from acrylic, polyester and urethane varnishes. A hardening-type varnish is preferably used in order to improve the abrasion resistance, heat resistance and solvent resistance of a decorative sheet. It is particularly preferable to use a urethane varnish to ensure the adhesion between the top coat layer and the built-up printed portion, and to increase the gloss.

The top coat layer can be formed by a coating process and by a subsequent hardening process. In order to uniformly cover the embossed pattern surface, the coating may be conducted by a conventional method such as gravure reverse-roll coating, gravure direct coating, air knife coating, wire bar coating, roll coating, doctor blade coating or dip coating.

As mentioned previously, the gloss of the built-up printed portion formed on the vessel-pattern-printed portion is enhanced by the formation of the top coat layer. Moreover, the top coat layer acts to make the bark pattern area matte, while it increases the gloss of the built-up printed portion. Such a difference in the gloss between these two portions makes the appearance of the grain pattern more excellent. This is because the wood matrix pattern area absorbs a coating liquid applied to form the top coat layer and becomes matte, and, on the other hand, the gloss of the built-up printed portion is further increased by the top coat layer because the built-up printed portion itself has a gloss. The gloss value of the glossy portion can be determined by the method described in JIS-Z8741.

The present invention will now be explained more specifically by referring to the following Examples and Referential Examples. In the following examples, "part(s)" and "%" are by weight unless otherwise indicated.

EXAMPLES

Decorative sheets and laminates of Examples 1 to 5 were prepared.

A solid print layer 2, and a grain-pattern-printed layer 3 having a vessel-pattern-printed portion 4 were formed by conducting uniform printing on the entire surface of thin paper for construction with a basis weight of 50 g/m² ("PA50" manufactured by Nagoya Pulp K. K., Japan) by means of gravure printing, using a printing ink A ("AQ" manufactured by Showa Ink Kogyo K.K., Japan) having the following formulation in an amount of 2 to 3 g/cm² (dry basis).

Printing Ink A:

Pigment: Carbon black, iron oxide, benzidine yellow, phthalocyanine yellow or the like Binder: Vinyl chloride resin, acrylic resin or the like Plasticizer: Phthalate ester plasticizer Solvent: Ethyl acetate, toluene, MHBK, MEK, butyl acetate or the like By changing the type, formulation and content of the above pigments and patterns, grain patterns with different color tones were printed. In order to improve the visual effect of the final printed products, it is preferable to use the grain pattern of "oak" or "ash", and to make the pattern resemble to a so-called country-style scrubbed finish.

Thereafter, a built-up printed layer 5 which was white in color was formed on the above grain-pattern-printed layer by using, for example, the following printing ink B so that it would be able to correspond with the vessel-pattern-printed portion 4. The built-up printed layer was cured by drying at 160° C. for 10 seconds.

| Printing Ink B: | |
| --- | --- |
| Titanium white | 14 parts |
| Microsilica | 1 part |
| Reactive plastisol | 38 parts |
| Trimethylolpropane trimethacrylate | 25 parts |
| Epoxy compound | 1 part |
| Triol | 1 part |
| Dioctyl phthalate | 8 parts |
| Mineral spirit | 6 parts |
| Benzoyl peroxide | 6 parts |

Further, in Example 5, a hardening-resin composition ("KR-90" manufactured by Intec Inc., Japan) capable of forming a transparent film, having the following formulation C was coated on top of the above grain-pattern-printed layer and built-up printed layer by means of gravure printing, and then dried at 60° C. for 20 seconds to form 10 g/m² (dry basis) of a top coat layer, whereby a decorative sheet according to the present invention was obtained. The hardening of the above-described built-up printed layer is completed by the heat applied for the drying and also by the action of the benzyl peroxide.

| Formulation C: | |
| --- | --- |
| Acryl polyol | 37 parts |
| Hexamethylene diisocyanate | 12 parts |
| Silicone | 2 parts |

Formulation C:

| | |
|---|---|
| Toluene | 24 parts |
| Ethyl acetate | 24 parts |
| Wax | 1 part |

Each of the above-obtained decorative sheets was laminated to a piece of plywood having a thickness of 2.7 mm by a roll laminating process, using an adhesion of a vinyl acetate emulsion, whereby decorative laminates were obtained.

The type of the epoxy compound contained in the composition used for forming the built-up printed layer, the color difference between the built-up printed layer and the bark pattern area, and the presence of the top coat layer are as follows:

| | Epoxy Compound | Color Difference ΔE | Top Coat Layer |
|---|---|---|---|
| Example 1 | Epoxidized soybean oil | 26.2 | absent |
| Example 2 | Epoxidized soybean oil | 57.2 | absent |
| Example 3 | Epoxidized soybean oil | 4.23 | absent |
| Example 4 | Epoxidized linseed oil | 26.49 | absent |
| Example 5 | Epoxidized linseed oil | 44.94 | present |

Decorative sheets of the following Referential Examples 1 to 3 were made in the same manner as in the above Examples. It is noted that a vinyl chloride foaming ink (manufactured by Showa Ink Kogyo K.K.) having the following formulation was used in Referential Example 3.

| Formulation of Foaming Ink Composition: | |
|---|---|
| Vinyl chloride paste | 46 parts |
| Titanium white | 18 parts |
| Dioctyl phthalate | 22 parts |
| Ba/Zn Stabilizer | 2 parts |
| Foaming agent (azodicarbon amide) | 5 parts |
| Microsilica | 1 part |
| Triol | 1 part |
| Mineral spirit | 7 parts |

The type of the epoxy compound contained in the composition used for forming the built-up printed layer, the color difference between the built-up printed layer and the bark pattern area, and the presence of the top coat layer are as follows.

| | Epoxy Compound | Color Difference ΔE | Top Coat Layer |
|---|---|---|---|
| Referential Example 1 | Epoxidized soybean oil | 60.8 | absent |
| Referential Example 2 | Epoxidized soybean oil | 72.9 | absent |
| Referential Example 3 | The above foaming ink | 74.5 | present |

The decorative sheet side of each of the decorative laminates obtained in the above Examples and Referential Examples was subjected to abrasion resistance test and heat resistance test. The test methods are as follows.

Abrasion Resistance:

Tester: Taber abrader (manufactured by Rigaku Kogyo K.K., Japan), truck wheel (CS-17), load 1 kg Evaluation standard: The number of rotations before the bulged printed portion was abraded to half was recorded.

Heat Resistance:

Thermal press (5 kg/cm², 170° C.) was conducted for 20 minutes, and the changes in the color tone and in the built-up portion were visually observed.

Further, the decorative laminates obtained in the above Examples and Referential Examples were visually compared with a natural oak material with a scrubbed finish to evaluate the finish.

The results of the tests and of the evaluation of the finish are shown in the following table.

| | Finish | Abrasion Resistance | Heat Resistance |
|---|---|---|---|
| Example 1 | ○ | ○ | ○ |
| Example 2 | ○ | ○ | ○ |
| Example 3 | ○ | ○ | ○ |
| Example 4 | ○ | ○ | ○ |
| Example 5 | ○ | ○ | ○ |
| Referential Example 1 | × | ○ | ○ |
| Referential Example 2 | × | ○ | ○ |
| Referential Example 3 | × | × | × |

Evaluation standards are as follows:

Finish:

○: good (resemble to the natural wood with a scrubbed finish)

X: poor

Abrasion resistance:

○: good (abraded at 450 times or more rotations)

X: poor (abraded at 150 times or less rotations)

Heat resistance:

○: good (no change was found in both the color tone and the bulged printed portion)

X: poor (collapse was found in the bulged printed portion)

We claim:

1. A decorative sheet comprising:

a substrate sheet, and a pattern including a vessel pattern portion, printed layer having a grain pattern, formed on the substrate sheet, a built-up printed portion being provided on at least a part of the vessel pattern portion in the grain pattern in such a manner that the built-up printed portion substantially corresponds to the vessel pattern portion, said decorative sheet having a color difference between the grain pattern and the built-up printed portion of no more than 60 when measured in accordance with JIS-Z8730.

2. The decorative sheet according to claim 1, wherein the built-up printed portion formed on the vessel pattern portion has a gloss.

3. The decorative sheet according to claim 1, further comprising a top coat layer formed on the outermost surface of the grain-pattern-printed layer.

4. The decorative sheet according to claim 3, wherein a portion of the top coat layer which corresponds to a portion other than the built-up printed portion is matte, and a portion of the top coat layer which corresponds to the built-up printed portion is glossy.

5. The decorative sheet according to claim 1 wherein the built-up printed portion is made of a cured product of a coloring ink composition comprising (a) a coloring agent, and (b) a binder which contains an epoxy compound, a vinyl chloride copolymer and a reactive acrylic compound.

6. The decorative sheet according to claim 5, wherein the epoxy compound contained in the binder of the coloring ink composition for forming the built-up printed portion is at least one compound selected from epoxidized triglycerides, epoxidized fatty monoesters and condensation products of epichlorohydrine and bisphenol.

7. The decorative sheet according to claim 1, wherein the height of the built-up printed portion is from 10 to 150 µm.

* * * * *